(12) United States Patent
Paek et al.

(10) Patent No.: US 10,380,338 B2
(45) Date of Patent: Aug. 13, 2019

(54) SYSTEM AND METHOD FOR INTRA-LEVEL PRIVILEGE SEPERATION FOR SYSTEM SOFTWARE ON ARM

(71) Applicant: SEOUL NATIONAL UNIVERSITY R&DB FOUNDATION, Seoul (KR)

(72) Inventors: Yunheung Paek, Seoul (KR); Yeongpil Cho, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 15/827,366

(22) Filed: Nov. 30, 2017

(65) Prior Publication Data

US 2019/0065737 A1 Feb. 28, 2019

(30) Foreign Application Priority Data

Aug. 23, 2017 (KR) ........................ 10-2017-0106617

(51) Int. Cl.
*G06F 21/53* (2013.01)
*G06F 12/1009* (2016.01)
*G06F 9/455* (2018.01)
*G06F 12/02* (2006.01)

(52) U.S. Cl.
CPC .......... *G06F 21/53* (2013.01); *G06F 9/45558* (2013.01); *G06F 12/0292* (2013.01); *G06F 12/1009* (2013.01); *G06F 2009/45583* (2013.01); *G06F 2009/45587* (2013.01)

(58) Field of Classification Search
CPC ... G06F 9/45558; G06F 21/53; G06F 12/0292
See application file for complete search history.

(56) References Cited

U.S. PATENT DOCUMENTS

2012/0151117 A1* 6/2012 Tuch ................... G06F 12/1491
711/6

FOREIGN PATENT DOCUMENTS

KR 10-1099463 B1 12/2011
WO WO 2014/021919 A2 2/2014

OTHER PUBLICATIONS

"ARM Architecture Reference Manual", ARMv7-A and ARMv7-R edition, pp. B3-1318 to B3-1355 (Year: 2014).*
Azab, A.H. et al., "SKEE: A Lightweight Secure Kernel-level Execution Environment for ARM," NDSS '16, Feb. 21-24, 2016, San Diego, California, USA, fifteen pages.

(Continued)

*Primary Examiner* — Edward J Dudek, Jr.
(74) *Attorney, Agent, or Firm* — Fenwick & West LLP

(57) ABSTRACT

Embodiments relate to an intra-level privilege separation method for managing system software on an ARM processor, including dividing the system software into an inner domain and an outer domain having different privilege levels, determining whether to permit the access to a memory region of the inner domain based on the type of domain that is currently in control among the inner domain and the outer domain, setting the memory region of the inner domain outside of valid virtual address range when the outer domain is in control, and setting memory regions of the inner domain and the outer domain inside of valid virtual address range when the inner domain is in control.

12 Claims, 16 Drawing Sheets

(56) References Cited

OTHER PUBLICATIONS

Dautenhahn, N. et al., "Nested Kernel: An Operating System Architecture for Intra Kernel Privilege Separation," *ASPLOS '15*, Mar. 14-18, 2015, Istanbul, Turkey, sixteen pages.
IAMROOT.ORG, "TTBCR and TTBR," Jul. 17, 2013, nine pages. [Online] [Retrieved Jan. 25, 2019] Retrieved from the Internet<URL:http://www.iamroot.org/xe/index. php?mid=Kemel &document_srl=2444 3>.

* cited by examiner

FIG. 3

| OUTER DOMAIN VIEW | INNER DOMAIN VIEW |
|---|---|
| Outer Domain Code (PERMISSION: rx) | Outer Domain Code (PERMISSION: rx) |
| Outer Domain Data (PERMISSION: rw) | Outer Domain Data (PERMISSION: rw) |
| Page Table (PERMISSION: r) | Page Table (PERMISSION: rw) |
| Inner Domain Code (NOT ACCESIBLE) | Inner Domain Code (PERMISSION: rx) |
| Inner Domain Data (NOT ACCESIBLE) | Inner Domain Data (PERMISSION: rw) | r: READ, w: WRITE, x: EXECUTION

FIG. 6A

```
1   /**
2    * Inner Domain Call (IDC)
3    *
4    * @param   cmd             a command
5    * @param   [arg0-arg3]     four parameters
6    */
7   .global  IDC
8  IDC:
9
10  /* The entry gate */
11      mrs     x5, DAIF                        Read interrupt status
12      stp     x30, x5, [sp, #-16]!            Save interrupt status
13      msr     DAIFset, 0x3                    Disable interrupts
14  1:
15      mrs     x5, tcr_el1                     Read the current TCR
16      and     x5, x5, #0xfffffffffffdffff     ; Set TCR.T1SZ to 25
17      orr     x5, x5, #0x400000               ; Set TCR.A1
18      msr     tcr_el1, x5                     Configure TCR
19      isb                                     Instruction synchronization barrier
20
21      mov     x6, #0xc03f                     Check the value of TCR
22      mov     x7, #0x1b                       ; TCR.T1SZ = 25 (39-bit address space)
23      movk    x6, #0xc07f, lsl #16            ; TCR.T0SZ = 27 (37-bit address space)
24      movk    x7, #0x8059, lsl #16            ; TCR.TG1 = 0b10 (4KB page size)
25      and     x5, x5, x6                      ; TCR.TG0 = 0b00 (4KB page size)
26      cmp     x5, x7                          ; TCR.A1 = 1 (Use TTBR1.ASID)
27      b.ne    1b                              If not correct, configure TCR again
28
29      mrs     x6, mpidr_el1                   Get number of the current core [0-n]
30      ubfx    x5, x6, #8, #4
31      and     x6, x6, #0xf
32      orr     x6, x6, r5, lsl #2
33      add     x6, x6, #1                      Add 1 to the core number
```

FIG. 6B

```
34   adrp   x5, InnerDomain_stack        Get the base address of the inner domain stack
35   add    x5, x5, x6, lsl #12          Get the inner domain stack of the current core
36   mov    x6, sp                       Get the outer domain stack
37   mov    sp, x5                       Switch to the inner domain stack
38   str    x6, [sp, #-8]!               Save the outer domain stack
39
40   adrp   x5, InnerDomain_handler      Get the address of the inner domain handler
41   blr    x5                           Jump to the inner domain handler
42
43
44
45   /* The exit gate */
46   ldp    x6, [sp], #8                 Restore the outer domain stack
47   mov    sp, x6                       Switch to the outer domain stack
48 2:
49   mrs    x5, tcr_el1                  Read the current TCR
50   and    x5, x5, #0xffffffffffbfffff  ; Set TCR.T1SZ to 27
51   orr    x5, x5, #0x20000             ; Clear TCR.A1
52   msr    tcr_el1, x5                  Configure TCR
53
54   mov    x6, #0xc03f                  Check the value of TCR
55   mov    x7, #0x1b                    ; TCR.T1SZ = 27 (37-bit address space)
56   movk   x6, #0xc07f, lsl #16         ; TCR.T0SZ = 27 (37-bit address space)
57   movk   x7, #0x801b, lsl #16         ; TCR.TG1 = 0b10 (4KB page size)
58   and    x5, x5, x6                   ; TCR.TG0 = 0b00 (4KB page size)
59   cmp    x5, x7                       ; TCR.A1 = 0 (Use TTBR0.ASID)
60   b.ne   2b                           If not correct, configure TCR again
61
62   ldp    x30, x5, [sp], #16           Restore interrupt status
63   msr    DAIF, x5                     Enable interrupts
64   isb                                 Instruction synchronization barrier
65
66   ret                                 Return to the outer domain
```

FIG. 9

Round-Trip Cycles (RTC)

|  | Big core | | Little core | |
| --- | --- | --- | --- | --- |
|  | w/ ASID | w/ TI | w/ ASID | w/ TI |
| RTC | 424 | 832 | 210 | 249 |

FIG. 10

LMBENCH RESULTS

| Test | Big core | | | | | Native | Little core | | | | |
|---|---|---|---|---|---|---|---|---|---|---|---|
| | Present invention | | Overhead | | Native | | Present invention | | Overhead | | |
| | w/ ASID | w/ TI | w/ ASID | w/ TI | | | w/ ASID | w/ TI | w/ ASID | w/ TI | |
| null syscall | 0.44 | 0.44 | 0.00 % | 0.00 % | 0.44 | 0.43 | 0.44 | 0.44 | 2.33 % | 2.33 % | |
| open/close | 6.35 | 6.44 | -0.31 % | 1.10 % | 6.37 | 12.65 | 12.67 | 12.74 | 0.16 % | 0.71 % | |
| stat | 2.64 | 2.66 | -0.38 % | 0.38 % | 2.65 | 5.06 | 5.11 | 5.14 | 0.99 % | 1.58 % | |
| sig. handler inst | 0.68 | 0.69 | 0.00 % | 1.47 % | 0.68 | 0.91 | 0.91 | 0.91 | 0.00 % | 0.00 % | |
| sig. handler ovh | 3.27 | 3.32 | 0.31 % | 1.84 % | 3.26 | 5.98 | 5.94 | 5.97 | -0.67 % | -0.17 % | |
| pipe latency | 14.27 | 18.38 | 11.40 % | 43.48 % | 12.81 | 26.70 | 28.54 | 31.80 | 6.89 % | 19.10 % | |
| page fault | 2.40 | 3.80 | 27.66 % | 102.13 % | 1.88 | 2.81 | 3.69 | 5.52 | 31.32 % | 96.44 % | |
| fork+exit | 176.84 | 240.18 | 19.20 % | 61.89 % | 148.36 | 255.05 | 292.21 | 369.69 | 14.57 % | 44.95 % | |
| fork+execv | 195.35 | 254.10 | 19.42 % | 55.34 % | 163.58 | 279.70 | 314.50 | 396.36 | 12.44 % | 41.71 % | |
| mmap | 2796.00 | 3992.00 | 20.36 % | 71.85 % | 2323.00 | 4654.00 | 5187.00 | 6718.00 | 11.45 % | 44.35 % | |

FIG. 11

SYNTHETIC BENCHMARK RESULTS

| Test | | Native | Present Invention | | Overhead | | | |
|---|---|---|---|---|---|---|---|---|
| | | | w/ ASID | w/TI | w/ ASID ($\sigma$) | | w/TI ($\sigma$) | |
| CF-Bench | | 42243.5 | 41111.8 | 36770.4 | 2.68 % | (11.00) | 12.96 % | (13.58) |
| GeekBench | single core | 842.6 | 844.4 | 840.0 | -0.21 % | (0.93) | 0.31 % | (0.97) |
| | multi core | 1891.6 | 1880.5 | 1886.0 | 0.59 % | (0.98) | 0.30 % | (1.64) |
| Quadrant | | 8137.9 | 8092.7 | 8139.2 | 0.56 % | (1.48) | -0.02 % | (1.47) |
| Smartbench | productivity | 4382.3 | 4291.8 | 4494.5 | 2.07 % | (10.80) | -2.56 % | (4.26) |
| | gaming | 2597.7 | 2552.4 | 2563.4 | 1.74 % | (13.45) | 1.32 % | (9.29) |
| Vellamo | browser | 2895.1 | 2893.2 | 2862.6 | 0.07 % | (2.03) | 1.12 % | (2.63) |
| | metal | 1350.9 | 1352.6 | 1348.9 | -0.13 % | (0.47) | 0.15 % | (0.57) |
| Antutu | | 41033.9 | 40964.3 | 40298.7 | 0.17 % | (2.22) | 1.79 % | (1.83) |

FIG. 12

LMBENCH RESULTS WITH A SECURITY APPLICATION

| Test | Big core | | | | | Little core | | | | |
| --- | --- | --- | --- | --- | --- | --- | --- | --- | --- | --- |
| | Native | Present Invention | | Overhead | | Native | Present Invention | | Overhead | |
| | | w/ ASID | w/ TI | w/ ASID | w/ TI | | w/ ASID | w/ TI | w/ ASID | w/ TI |
| null syscall | 0.44 | 0.81 | 1.28 | 84.09 % | 190.91 % | 0.43 | 1.01 | 1.66 | 134.88 % | 286.05 % |
| open/close | 6.37 | 7.28 | 8.73 | 14.29 % | 37.05 % | 12.65 | 13.82 | 16.09 | 9.25 % | 27.19 % |
| stat | 2.65 | 3.09 | 3.78 | 16.60 % | 42.64 % | 5.06 | 5.79 | 6.84 | 14.43 % | 35.18 % |
| sig. handler inst | 0.68 | 1.09 | 1.64 | 60.29 % | 141.18 % | 0.91 | 1.49 | 2.19 | 63.74 % | 140.66 % |
| sig. handler ovh | 3.26 | 3.68 | 4.44 | 12.88 % | 36.20 % | 5.98 | 6.55 | 7.45 | 9.53 % | 24.58 % |
| pipe latency | 12.81 | 19.86 | 27.84 | 55.04 % | 117.33 % | 26.70 | 40.44 | 50.04 | 51.46 % | 87.42 % |
| page fault | 1.88 | 2.38 | 3.74 | 26.60 % | 98.94 % | 2.81 | 3.73 | 5.48 | 32.74 % | 95.02 % |
| fork+exit | 148.36 | 182.54 | 237.13 | 23.04 % | 59.83 % | 255.05 | 292.61 | 374.27 | 14.73 % | 46.74 % |
| fork+execv | 163.58 | 195.19 | 257.85 | 19.32 % | 57.63 % | 279.70 | 322.22 | 404.57 | 15.20 % | 44.64 % |
| mmap | 2323.00 | 2786.00 | 3878.00 | 19.93 % | 66.94 % | 4654.00 | 5148.00 | 6641.00 | 10.61 % | 42.69 % |

FIG. 13

Synthetic Benchmark Results with a Security Application

| Test | | Native | Present Invention | | Overhead | |
|---|---|---|---|---|---|---|
| | | | w/ ASID | w/ TI | w/ ASID (σ) | w/ TI (σ) |
| CF-Bench | | 42243.5 | 36218.1 | 33107.9 | 14.26 % ( 5.00) | 21.63 % ( 4.37) |
| GeekBench | single core | 842.6 | 842.0 | 839.2 | 0.07 % ( 0.54) | 0.40 % ( 1.04) |
| | multi core | 1891.6 | 1890.6 | 1882.3 | 0.05 % ( 1.11) | 0.49 % ( 1.59) |
| Quadrant | | 8137.9 | 8032.8 | 8056.8 | 1.29 % ( 1.88) | 1.00 % ( 2.28) |
| Smartbench | productivity | 4863.8 | 4738.4 | 4253.8 | 2.58 % ( 4.60) | 12.54 % ( 6.54) |
| | gaming | 2649.9 | 2434.2 | 2613.4 | 8.14 % ( 9.58) | 1.38 % (12.18) |
| Vellamo | browser | 2895.1 | 2892.2 | 2807.2 | 0.10 % ( 2.10) | 3.04 % ( 2.32) |
| | metal | 1350.9 | 1341.7 | 1341.8 | 0.68 % ( 0.65) | 0.67 % ( 0.67) |
| Antutu | | 41033.9 | 40861.1 | 40307.9 | 0.42 % ( 1.92) | 1.77 % ( 2.58) |

SYSTEM AND METHOD FOR INTRA-LEVEL PRIVILEGE SEPERATION FOR SYSTEM SOFTWARE ON ARM

CROSS-REFERENCE TO RELATED APPLICATION

This application claims priority to Republic of Korea Patent Application No. 10-2017-0106617, filed on Aug. 23, 2017, and all the benefits accruing therefrom under 35 U.S.C. § 119, the contents of which in its entirety are herein incorporated by reference.

BACKGROUND

1. Field

The present disclosure relates to a system and method for system software management, and more particularly, to a system and method for intra-level privilege separation for system software on ARM.

2. Description of the Related Art

Recently, with the advancement of technology, there is a growing trend towards mobile systems having at least one system software mounted thereon. In this situation, when attack corrupts an arbitrary system software, a serious problem occurs, such as the stealing of personal information stored in the system.

[Description about National Research and Development Support]

This study was supported by Project No. 1711044383 and 1711042399 of the Ministry of Science, ICT and Future Planning.

This study was supported by Project No. 1345258209 of the Ministry of Education.

RELATED LITERATURES

Patent Literatures (Patent Literature 1) PCT/US2013/000074

Non-Patent Literatures (Non-Patent Literature 1) Nested Kernel: An Operating System Architecture for Intra-Kernel Privilege Separation
(Non-Patent Literature 2) SKEE: A Lightweight Secure Kernel-level Execution Environment for ARM

SUMMARY

To solve the problem such as the foregoing, a solution is required to protect sensitive computation of the system even though attacks have corrupted system software, by dividing the system software into a domain performing a minority of sensitive computation and a domain performing a majority of computation that is not sensitive.

The technical problem of the present disclosure is not limited to the foregoing, and technical problems other than those described in the foregoing will be clearly understood by those skilled in the art from the following description.

An intra-level privilege separation system for managing system software on an ARM processor according to an embodiment of the present disclosure includes an intra-level domain isolation unit configured to divide the system software into an inner domain and an outer domain having different privilege levels, and a domain switching unit configured to determine whether to permit the access to a memory region of the inner domain based on the type of domain that is currently in control among the inner domain and the outer domain.

In a preferred embodiment, the system software is based on first translation table base register (TTBR0), the intra-level domain isolation unit may set the memory region of the inner domain outside of valid virtual address range when the outer domain is in control, and may set memory regions of the inner domain and the outer domain inside of valid virtual address range when the inner domain is in control, and the first translation table base register may start the virtual address space translation from the bottom (0).

In a preferred embodiment, the intra-level domain isolation unit may set T0SZ within translation control register (TCR) to 27 when the outer domain is in control, and may set T0SZ within translation control register (TCR) to 26 when the inner domain is in control.

In a preferred embodiment, the system software is based on second translation table base register (TTBR1), the intra-level domain isolation unit may set the memory region of the inner domain outside of valid virtual address range when the outer domain is in control, and may set memory regions of the inner domain and the outer domain inside of valid virtual address range when the inner domain is in control, and the second translation table base register may start the virtual address space translation from the top (0xFFFF FFFF FFFF FFFF).

In a preferred embodiment, the intra-level domain isolation unit may set T0SZ within translation control register (TCR) to 27 when the outer domain is in control, and may set T0SZ within translation control register (TCR) to 25 when the inner domain is in control, and data in the virtual address space associated with the inner domain may be mapped to intermediate entries in page table entries of the inner domain.

In a preferred embodiment, shadow mapping of page table may be configured as readable and writable, and a fixed offset of the shadow mapping may be added in a virtual address space of the inner domain.

In a preferred embodiment, the domain switching unit may insert code snippet confirming a value of the translation control register into control instructions of translation control register (TCR).

In a preferred embodiment, the domain switching unit may add code snippet checking a value of translation control register before interrupt handler, and when the translation control register does not have a corresponding to the outer domain, the domain switching unit may halt the system.

In a preferred embodiment, the domain switching unit may configure an address space of the inner domain as non-global, and assign a unique Address Space Identifier (ASID) to the inner domain.

In a preferred embodiment, the system software may include at least one of a normal OS, a secure OS, a hypervisor, and an ARM TrustZone.

An intra-level privilege separation method for managing system software on an ARM processor according to an embodiment of the present disclosure includes dividing the system software into an inner domain and an outer domain having different privilege levels, determining whether to permit the access to a memory region of the inner domain based on the type of domain that is currently in control among the inner domain and the outer domain, setting the memory region of the inner domain outside of valid virtual address range when the outer domain is in control, and setting memory regions of the inner domain and the outer domain inside of valid virtual address range when the inner domain is in control.

In a preferred embodiment, the system software is based on first translation table base register (TTBR0), and the method may further include setting T0SZ within translation control register (TCR) to 27 when the outer domain is in control, and setting T0SZ within translation control register (TCR) to 26 when the inner domain is in control.

In a preferred embodiment, the system software is based on second translation table base register (TTBR1), and the method may further include setting T0SZ within translation control register (TCR) to 27 when the outer domain is in control, and setting T0SZ within translation control register (TCR) to 25 when the inner domain is in control, wherein data in a virtual address space associated with the inner domain may be mapped to intermediate entries in page table entries of the inner domain.

According to an embodiment of the present disclosure, for each system software, two domains are each privileged differently to establish a minimal TCB for ensuring security even if each system software is attacked, thereby improving the safety of the entire system.

The effects of the present disclosure are not limited to the foregoing, and effects other than those described in the foregoing will be clearly understood by those skilled in the art from the appended claims.

BRIEF DESCRIPTION OF THE DRAWINGS

FIG. 3 shows an address space layout of an inner domain and an outer domain according to an embodiment of the present disclosure.

FIGS. 6A and 6B show IDC (Inner Domain Call) included in a domain switching unit 120 according to an embodiment of the present disclosure.

FIGS. 9 to 13 show experimental results according to an embodiment of the present disclosure.

DETAILED DESCRIPTION

Figure 1:
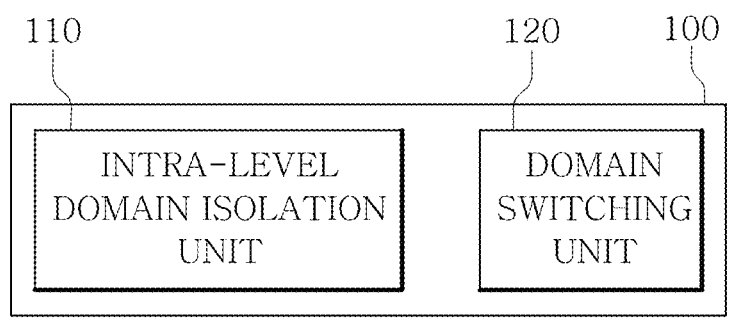
FIG. 1 is a block diagram of a system for intra-level privilege separation according to an embodiment of the present disclosure.

The terminology used herein is for the purpose of describing particular embodiments only and is not intended to be limiting of the present disclosure. As used herein, the singular forms are intended to include the plural forms as well, unless the context clearly indicates otherwise. It will be further understood that the term "comprising" or "having" when used in this specification specify the presence of stated features, integers, steps, operations, elements, components or groups thereof, but do not preclude the presence or addition of one or more other features, integers, steps, operations, elements, components or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art, and will not be interpreted in an idealized or overly formal sense unless expressly so defined herein. Like reference signs presented in the drawings indicate like elements. Rather, in the description of embodiments, when certain details of related well-known features or structures are deemed to unnecessarily render the subject matter of the present disclosure vague, its detailed description is omitted herein. Furthermore, the size of each element in the drawings may be exaggerated for description, and does not represent an actual size.

The embodiment described herein may have aspects of entirely hardware, or hardware in part and software in part, or entirely software. The term "unit", "module", "device" or "system" as used herein refer to a computer related entity such as hardware, combination of hardware and software, or software. For example, the unit, module, device or system as used herein may be a process being executed, a processor, an object, an executable, a thread of execution, a program, and/or a computer, but is not limited thereto. For example, both an application being executed in a computer and the computer may correspond to the unit, module, device or system as used herein.

The phrase 'configured (or set) to' as used herein may be interchangeably used with, for example, 'suitable for', 'having the capacity to', 'designed to', 'adapted to', 'made to' or 'capable of' according to the situation. The phrase 'configured (or set) to' may not necessarily represent only 'specifically designed to' in terms of hardware. Instead, in a certain situation, the phrase 'a device configured to' may represent that the device is 'capable of' in conjunction with other device or components. For example, the phrase 'a processor configured (or set) to perform A, B, and C' may refer to a dedicated processor (e.g., an embedded processor) for performing the corresponding operation or a generic-purpose processor (e.g., CPU or an application processor) that can perform the corresponding operations by executing at least one software program stored in a memory device.

The electronic device according to various embodiments of the present disclosure may include, for example, at least one of smartphone, tablet personal computer (PC), mobile phone, video phone, e-book reader, desktop PC, laptop PC, netbook computer, workstation, server, personal digital assistants (PDA), portable multimedia player (PMP), MP3 player, mobile medical equipment, camera, and a wearable device. According to various embodiments, the wearable device may include at least one of accessary type (e.g., watch, ring, wrist bracelet, ankle bracelet, necklace, glasses, contact lens, and head-mounted device (HMD)), fabric or clothes integrated type (e.g., electronic clothes), wearable type (e.g., skin pad or tattoo), and implantable type (e.g., implantable circuit).

In certain embodiments, the electronic device may be home appliance. The home appliance may include, for example, at least one of television, digital video disk (DVD) player, audio player, refrigerator, air conditioner, cleaner, oven, microwave, washing machine, air purifier, set-top box, home automation control panel, security control panel, TV box (e.g., Samsung HomeSync™, Apple TV™, or Google TV™), game console (e.g., Xbox™, PlayStation™), electronic dictionary, electronic key, camcorder, and electronic photo frame.

The embodiments are described with reference to the flowchart presented in the drawings. While for purposes of simplicity of description, the method is illustrated and described as a series of blocks, the present disclosure is not limited to the order of the blocks, and some blocks may occur in different orders or concurrently with other blocks from what is depicted and described herein, and various other branches, flow paths and orders of the blocks may be implemented which achieve the same or a similar result. Furthermore, not all illustrated blocks may be required to implement the method described herein. Further, the method according to an embodiment of the present disclosure may be realized in the form of a computer program for performing a series of processes, and the computer program may be recorded in a computer-readable recording medium.

Hereinafter, the embodiments of the present disclosure will be described in detail with reference to the accompanying drawings.

A system for intra-level privilege separation according to an embodiment of the present disclosure may be used to manage system software running on an ARM's processor. Here, ARM's processor may be 64 bit AArch64, but is not limited thereto and may be applied to any next-generation processor which is 64-bit (or other bit) and electronic devices based on it.

The system for intra-level privilege separation according to an embodiment of the present disclosure may include a processor core and a register bank to process a series of instructions.

Furthermore, the system for intra-level privilege separation may be software at least in part or in whole. However, in other embodiments, the system for intra-level privilege separation may be hardware at least in part, or software mounted-hardware.

The system for intra-level privilege separation divides system software into two domains. Here, the two domains include an inner domain and an outer domain which may run in the same processor privilege level. However, the inner domain becomes more privileged than the outer domain. For example, the inner domain may own exclusive control authority over system resources sensitive to security, such as page tables and system control registers. Accordingly, the system for intra-level privilege separation of the present disclosure protects the inner domain to protect system resources even if the outer domain is under control of attackers.

FIG. 1 is a block diagram of the system for intra-level privilege separation according to an embodiment of the present disclosure. Referring to FIG. 1, the system 100 for intra-level privilege separation may include an intra-level domain isolation unit 110 and a domain switching unit 120.

A computer device to which the system for intra-level privilege separation is applied may be a device including an ARM processor, a memory and a storage. That is, the present disclosure may be related to an apparatus and method for managing system software running on the ARM's processor. Here, the ARM processor may run or a kernel or an application program, or software of a hypervisor. The memory may be RAM or ROM, and the storage may be hard disk or SSD, but the present disclosure is not limited thereto.

The intra-level domain isolation unit 110 may divide system software into inner domains and outer domains having different privilege levels.

The domain switching unit 120 may determine whether to permit the access to the memory region of the inner domain based on the type of domain that is currently in control among the inner domain and the outer domain. To this end, the domain switching unit 120 may dynamically adjust the virtual address range based on the type of domain that is currently in control. Here, the system software may include at least one of a normal OS, a secure OS, a hypervisor and an ARM TrustZone, but the present disclosure is not limited thereto.

I Domain Isolation Mechanism

The intra-level domain isolation unit 110 separates (isolates) the two domains as described above to protect the inner domain. The intra-level domain isolation unit 110 enables the isolation and concealment of memory for the inner domain by dynamically adjusting the range of virtual address space.

Figure 2:
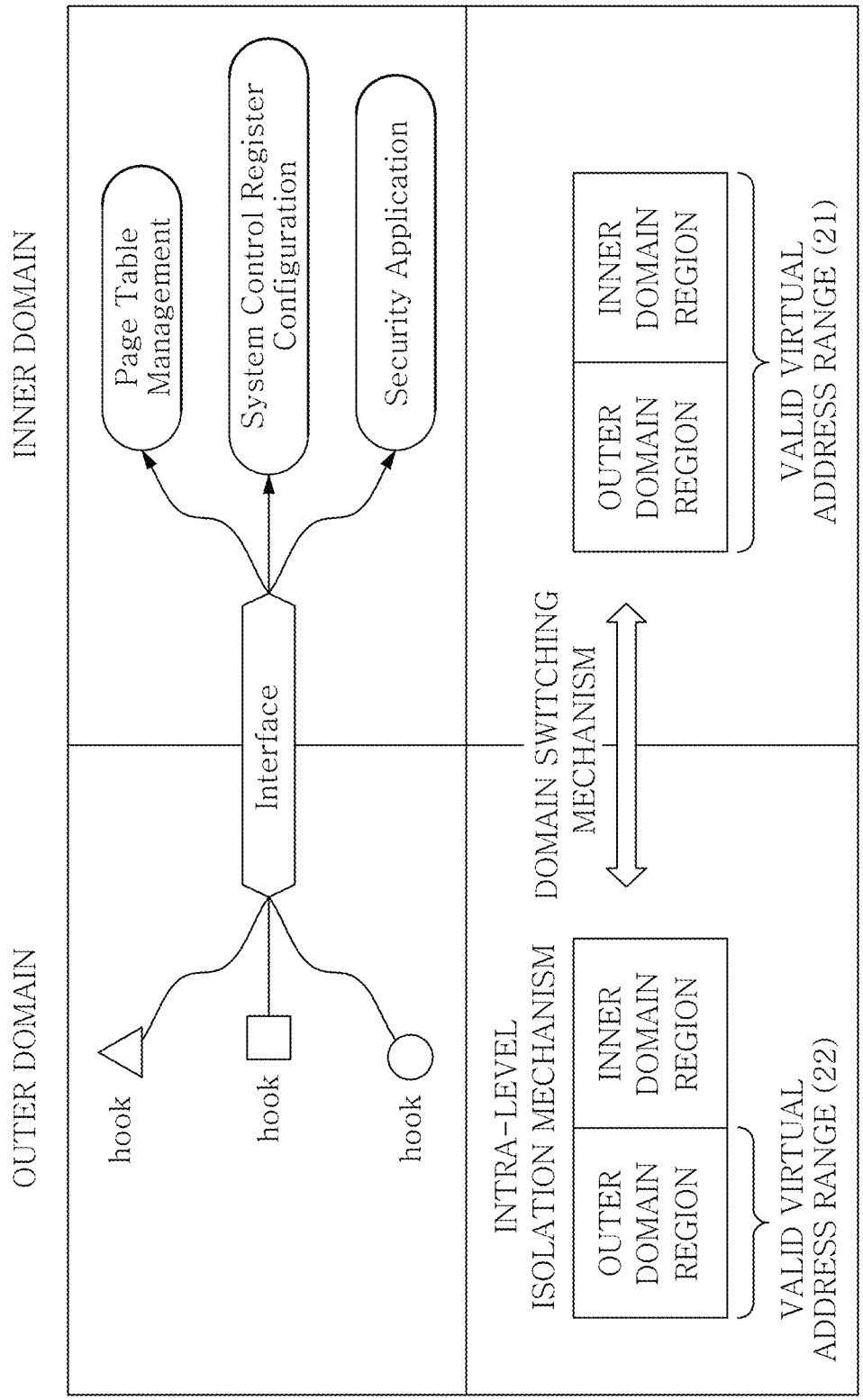
FIG. 2 is a diagram describing an intra-level privilege separation mechanism according to an embodiment of the present disclosure.

FIG. 2 is a diagram describing the intra-level privilege separation mechanism according to an embodiment of the present disclosure. Referring to FIG. 2, in the inner domain, the valid virtual address range 21 covers both the inner and outer domain regions, while in the outer domain, the valid virtual address range 22 only covers the outer domain region.

FIG. 3 shows an address space layout of the inner domain and the outer domain according to an embodiment of the present disclosure. Referring to FIG. 3, the intra-level domain isolation unit 110 may set the inner domain and the outer domain to make the two domains have asymmetric views on the memory address space. For example, the intra-level domain isolation unit 110 assigns different access permissions for memory blocks in each domain. Accordingly, the inner domain is assigned permission to access the whole memory region, and the outer one has more restricted accesses than the inner domain.

In the present disclosure, control authority over security-sensitive system resources such as page tables or system control registers is deprived of the outer domain, but is not deprived of the inner domain. Accordingly, the outer domain is allowed to send requests through a specified interface to the inner domain for controlling these system resources.

In an embodiment, when the outer domain is in control, the intra-level domain isolation unit 110 may set the memory region of the inner domain outside of the valid virtual address range, and when the inner domain is in control, may set the memory regions of the inner domain and the outer domain inside of the valid virtual address range.

Figure 4A:
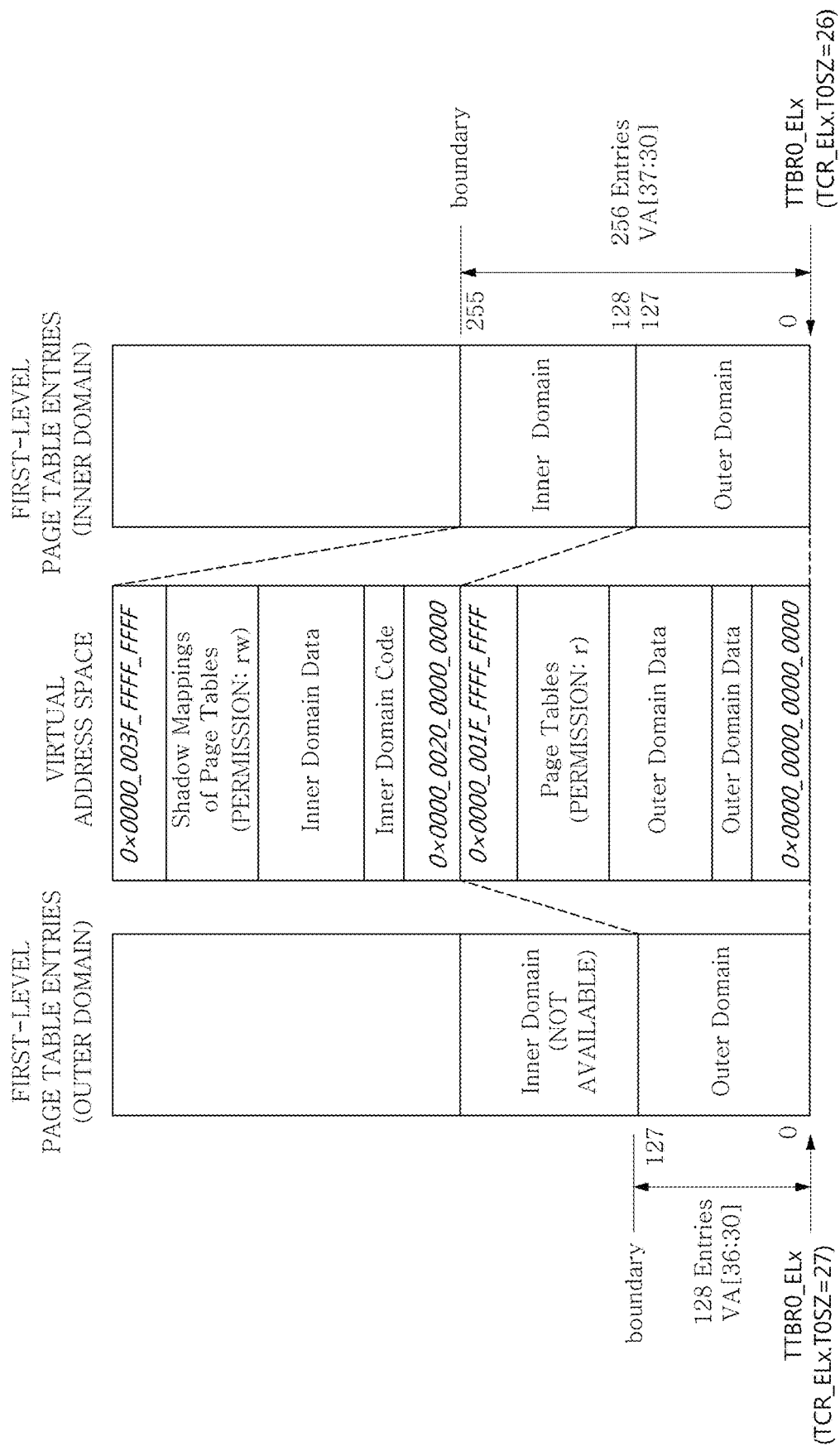
FIGS. 4A to 4C show an operation mechanism of a system for intra-level privilege separation according to an embodiment of the present disclosure.
Figure 4B:
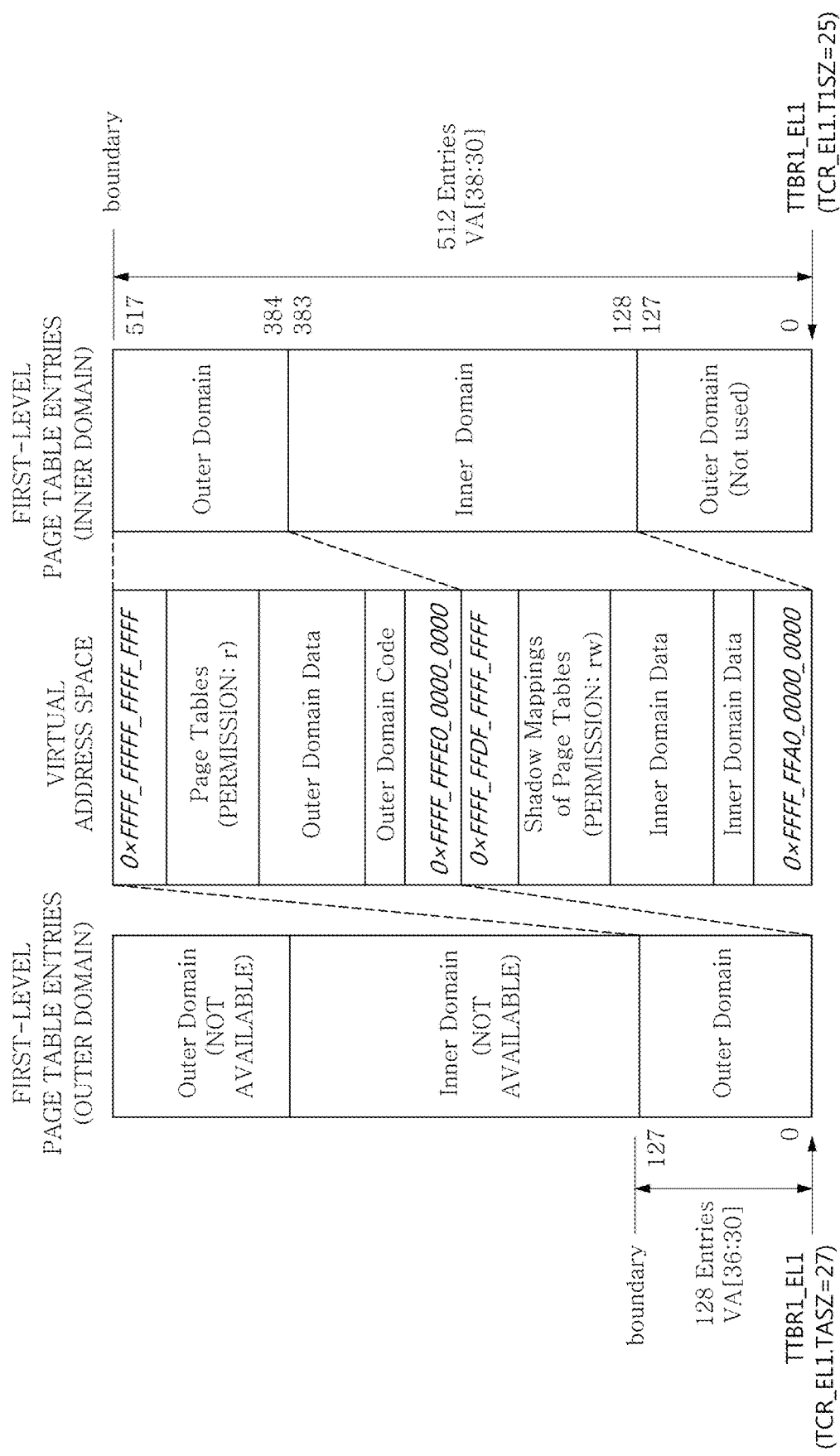
Figure 4C:
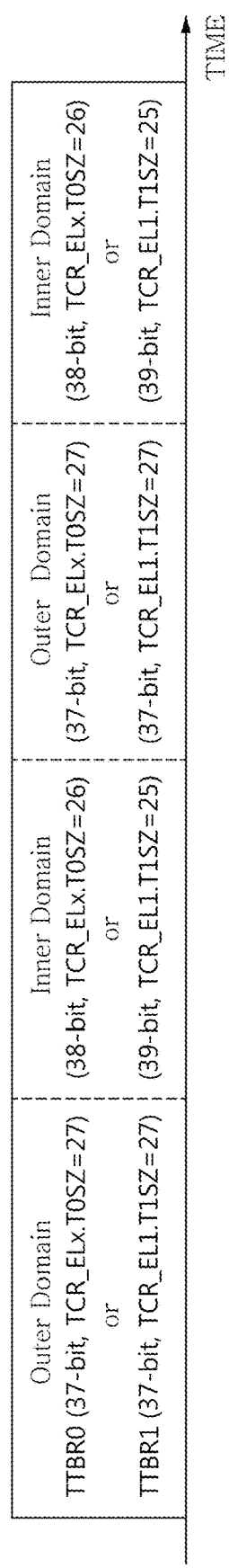

FIGS. 4A to 4C show an operation mechanism of the system for intra-level privilege separation according to an embodiment of the present disclosure. By either reducing or expanding the range of the valid address space at runtime (during the operation of the system), the system 100 for intra-level privilege separation may block or allow access to the memory region of the inner domain depending on which of the two domains is currently in control. First, FIG. 4C shows an example in which virtual address range adjustment descried in FIG. 4A or 4B is applied in a chronological order.

FIG. 4A shows an address mapping method for system software based on first translation table base register (TTBR0) according to an embodiment of the present disclosure. Here, the first translation table base register (TTBR0) is used to translate the virtual address space starting from the bottom (0).

In the specification and drawings, translation table base register (TTBR) or translation control register (TCR) can be applied at various exception levels such as an application (EL0), a normal OS and a security OS (EL1), a hypervisor (EL2) and secure monitor (EL3), and the system level to which the corresponding register is applied is indicated by an underbar as below. For example, TTBR0_E2 is register applied to a hypervisor, and here, x in Ex may be any number between 0 and 3.

When the outer domain is in control, the intra-level domain isolation unit may set T0SZ within the translation control register (TCR) to 27, and when the inner domain is in control, may set T0SZ within the translation control register (TCR) to 26.

Here, T0SZ and T1SZ are fields included in translation control register (TCR_ELx) at various levels. The translation control register (TCR_ELx) serves to control the memory management at each level defined as TTBR0_ELx, and T0SZ and T1SZ define the range of valid virtual address space.

Generally, each level has one TTBR0_ELx register. For example, level 2 has TTBR0_EL2, and in this instance, the valid virtual address space is defined through T0SZ of TCR_EL2. Exceptionally, however, level 1 has two TTBR registers, i.e., TTBR0_EL1 and TTBR1_EL1 to simultaneously indicate the user space and the kernel space. Accordingly, TCR_EL1 can define the range of valid virtual space with T0SZ and T1SZ corresponding to each TTBR register.

Referring to FIG. 4A, as the two domains share the same page table, the value of TTBR0_ELx (first translation table base register at any exception level) remains constant whether either the inner or outer domain is in control.

In FIG. 4A, while the outer domain has control, the valid virtual address range of the outer domain is restricted to 37 bit 3 (128 GB) by setting the field in translation control register (TCR) TCR_ELx.T0SZ to 27. Through this, all 128 first-level entries of the current page table, indicated by the upper seven bits of the virtual address (VA[36:30]), are used to map the outer domain. In this case, the outer domain cannot access the inner domain because there are no valid entries associated with the memory region of the inner domain.

On the other hand, when the inner domain has control, the valid virtual address range is expanded to 38 bits (256 GB) by changing the field in translation control register (TCR) TCR_ELx.T0SZ to 26. As a result, the number of valid first-level entries of the current page table increases to 256 from 128, and the upper eight bits of the virtual address (VA[37:30]) indicate associated entries. In this case, the original 128 entries still correspond to the memory region of the outer domain, and the expanded 128 entries correspond to the inner domain. Therefore, the inner domain can access the entire memory regions of both domains without restrictions.

FIG. 4B shows an address mapping method for system software based on second translation table base register (TTBR1) according to an embodiment of the present disclosure. Here, the second translation table base register (TTBR1) is used to translate the virtual address space starting from the top (for example, 0xFFFF FFFF FFFF FFFF).

In an embodiment, when the outer domain is in control, the intra-level domain isolation unit 110 may set the memory region of the inner domain outside of the valid virtual address range, and when the inner domain is in control, may set the memory regions of the inner domain and the outer domain inside of the valid virtual address range.

In an embodiment, when the outer domain is in control, the intra-level domain isolation unit 110 may set T0SZ within the translation control register (TCR) to 27, and when the inner domain is in control, may set T0SZ within the translation control register (TCR) to 25, and data in the virtual address space associated with the inner domain may be mapped to intermediate entries in the page table entries of the inner domain.

Generally, a normal OS and a secure OS running at EL1 (OS level) adopt TTBR1_EL1 (second translation table base register) for address translation on AArch64. However, OSes cannot use the isolation mechanism described in FIG. 4A. This is because the translation starting point and direction of TTBR1_EL1 is different from the translation starting point and direction of TTBR0_ELx.

That is, in an embodiment, when the value of TCR_EL1.T1SZ increases or decreases, the valid virtual address range and the valid first-level entries of the current page table change in the opposite direction. For example, when TCR_EL1.T1SZ is 27, the address 0xFFFF FFE0 0000 0000 is linked to the 0th first-level entry (see VA[36:30]).

Whereas, when TCR_EL1.T1SZ is changed to 26, the same virtual address is linked to the 256th entry (see VA[37:30] is 260), and the address 0xFFFF FFC0 0000 0000 is linked to the 0th entry (see VA[37:30] is 0). Such a discrepancy in the linkage between the virtual addresses and the first-level page entries would lead the same virtual addresses of the inner and outer domains to be mapped to different physical addresses.

To resolve the problem, the system for intra-level privilege separation according to an embodiment of the present disclosure uses an alternative address mapping strategy using second translation registers as shown in FIG. 4B. In this case, the valid virtual address range of the inner domain (39-bit, 512 GB) is four times larger than that of the outer domain through a change of TCR_EL1.T1SZ to 25 from 27. Accordingly, the number of the first-level entries of the current page table increases to 512 from 128.

The present disclosure uses 256 entries (from the 128th to the 383rd) in the middle of the first-level page table entries of the inner domain to map the inner domain region. If the bottom 128 entries (from the 0th to the 127th) are originally used to map the outer domain region, in the inner domain, these entries are not used to map the outer domain region.

However, the top 128 entries (from the 384th to the 511st) can be used, as, in the inner domain, these entries correspond to the virtual address space of the outer domain region.

Figure 5:
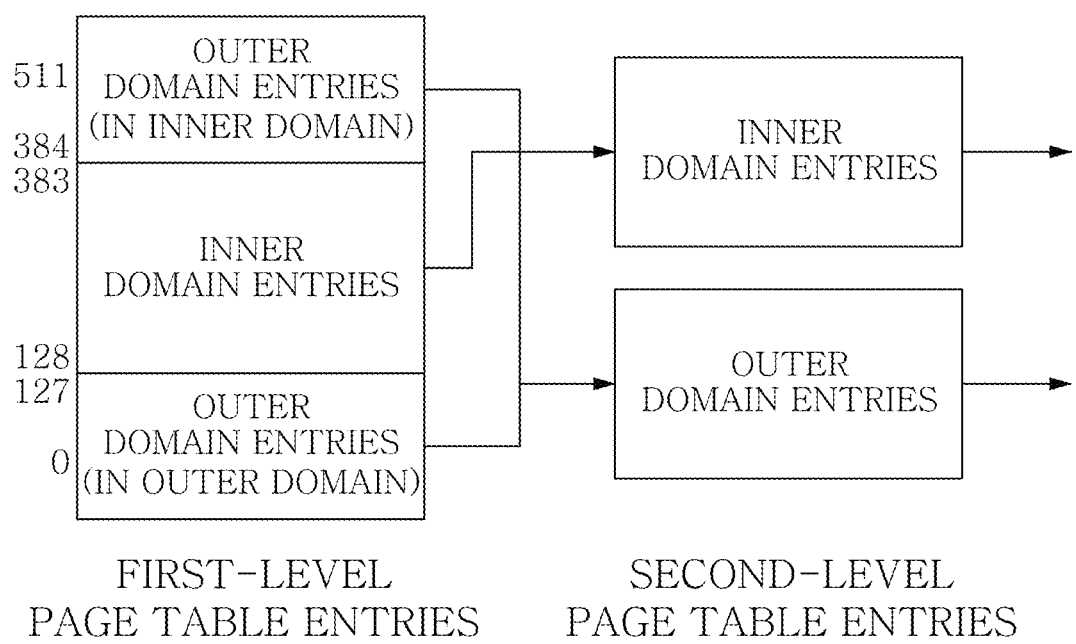
FIG. 5 shows the linkage between first-level and second-level page table entries according to an embodiment of the present disclosure.

FIG. 5 shows the linkage between the first-level and second-level page table entries according to an embodiment of the present disclosure. Referring to FIG. 5, the intra-level domain isolation unit 110 copies the contents of the bottom 128 entries to the top 128 entries, thereby configuring the top first-level entries to point to the same second-level entries that are pointed to by the bottom first-level entries. As a result, the inner domain can be allowed to access the outer domain region without the discrepancy problem because the virtual address space of the outer domain region remains the same between the inner and outer domains.

Furthermore, as the inner domain must be able to maintain a synchronized address view of the outer domain, if the bottom 128 entries of the current page table are populated or modified, the intra-level domain isolation unit 110 may repeat the same operations onto the top 128 entries. This synchronization method can be a solution to reduce overhead as the first-level entries are rarely modified after initial set-up.

In an embodiment of the present disclosure, the shadow mappings of the page tables may be configured as not only readable but also writable and a fixed offset may be added in the virtual address space of the inner domain. In the present disclosure, to prevent the outer domain from modifying the contents of page tables, the memory regions of page tables are configured as read-only. In an embodiment, the page tables may be recorded in the system 100 or any external register.

However, as the inner and outer domains share the same page tables, the inner domain also can be hindered from using the page tables by such a restriction. Accordingly, in an embodiment, the shadow mappings of the page tables may be configured as not only readable but also writable and a fixed offset may be added in the virtual address space of the inner domain. Therefore, the inner domain can update the contents of the page tables through the shadow mappings.

To ensure isolation of the inner domain from the outer domain, the page tables according to an embodiment of the present disclosure may satisfy at least one of the following constraints:

1) no part of the inner domain can be mapped to the memory region of the outer domain
2) the domain code must be configured as read-only
3) privileged instructions that can configure system control registers must not be executable in writable memory regions or in less privileged software's memory regions To achieve this, the intra-level domain isolation unit 110 according to an embodiment of the present disclosure may adopt the paging delegation technique used in previous work. The intra-level domain isolation unit 110 initially configures page tables as read-only to prevent the outer domain from modifying them. In addition, it instruments the outer domain code to route all page table modification operations to the inner domain. The inner domain may checks the constraints and performs those operations for the outer domain. Although the page tables are configured as read-only, the inner domain can modify the contents of the page tables through section shadow mapping.

Furthermore, even if the integrity of the page tables is preserved, the isolation mechanism can still be incapacitated through exploiting system control registers. For example, the outer domain could modify SCTLR (system control register) to remove memory protection by disabling the MMU or TCR to enlarge its virtual address range and access the inner domain region.

Therefore, the intra-level domain isolation unit 110 must deprive the outer domain of control authority over system control registers. For this, privileged instructions that control such sensitive registers in the outer domain are replaced with hooks so as to verify and emulate them in the inner domain.

First, as instruction opcodes have a fixed length and are aligned on AArch64, privileged instructions can be exhaustively identified, and second, due to the constraints enforced on the page tables mentioned above, attackers cannot execute any privileged instruction in the outer domain. Accordingly, the validity of this method can be ensured.

The intra-level isolation mechanism according to an embodiment of the present disclosure relies on the dynamic virtual address range adjustment based on TxSZ, so TCR containing the TxSZ field exists per processor core. Accordingly, the system of the present disclosure can enforce the intra-level isolation to each core separately by controlling each TxSZ of cores.

Furthermore, in an embodiment, loadable modules can be added to the outer domain to extend functionality (particularly, in a normal OS). However, it can provide attackers with room to compromise the inner domain by inserting privileged instructions relevant to system control registers into the outer domain. To address this problem, if the present disclosure detects any populations of new code pages or any modifications of code pages from the outer domain, it scans the corresponding pages to confirm whether or not they include privileged instructions and to enforce the protection policy.

To improve the performance, peripherals can access DRAM through Direct Memory Access (DMA) without the mediation of the CPU. However, attackers may exploit DMA to avoid the monitoring of a security entity residing in CPU. Furthermore, attackers would be able to evade monitors residing in the inner domain. To thwart DMA attacks, the apparatus of the present disclosure can use the System MMU as the counterpart of the conventional IOMMU.

To accomplish this, in the present disclosure, the intra-level domain isolation unit prevents the outer domain from modifying the page tables of the System MMU. When a request comes from the outer domain, the inner domain modifies the tables and allows DMA only after ensuring that there is no page table entry pointing to an inner domain region.

Meanwhile, not all peripherals can take advantage of the System MMU. Thus, the intra-level domain isolation unit according to an embodiment needs to restrict the outer domain from controlling DMA directly. On ARM, peripherals can perform DMA with their own custom DMA controller or with the general-purpose DMA controller of the SoC. In either case, the outer domain can only control DMA through memory-mapped control registers. Therefore, similar to DMA protection with the System MMU, the intra-level domain isolation unit can restrict DMA by only allowing the inner domain to write to regions corresponding to DMA control registers.

II Domain Switching Mechanism

In an embodiment of the present disclosure, the domain switching unit 120 may insert code snippets confirming the correctness of the value of translation control register (TCR) behind TCR control instructions.

Furthermore, the domain switching unit 120 adds code snippet, which checks the value of TCR, before the interrupt handler, and if TCR does not have the value corresponding to the outer domain, may halt the system.

In an example, the domain switching unit 120 may configure the address space of the inner domain as non-global, and assign a unique Address Space Identifier (ASID) to the inner domain.

The domain switching unit 120 may include an interface function (IDC) which stands for Inner Domain Call.

The IDC performs the control switching operation between the inner and outer domains, acting as a wrapper function for a handler which processes incoming requests in the inner domain. The IDC provides the outer domain with a unique way to enter the inner domain. In addition, IDCs are implanted across the outer domain and are invoked with specific parameters in order to handle sensitive resources by sending relevant requests to the inner domain.

FIGS. 6A and 6B show the inner domain call (IDC) function included in the domain switching unit 120 according to an embodiment of the present disclosure. The number written at the leftmost represents the line number, and although FIGS. 6A and 6B describe the operation at EL1, it may be also applied to other levels ELx in a similar manner.

Referring to FIGS. 6A and 6B, the IDC consists of the entry gate that expands the valid virtual address range to reveal and enter the inner domain and the exit gate that reduces the valid virtual address range to hide the inner domain and return to the outer domain.

If the IDC is invoked in the outer domain, the entry gate disables interrupts, expands the virtual address range, switches to the inner domain stack, and then jumps to the inner domain handler. After the inner domain finishes its work and returns from the handler, the exit gate executes the sequenced tasks of the entry gate in the opposite direction.

1) Virtual Address Range Adjustment

The key role of the IDC is to control the valid virtual address range to reveal or conceal the inner domain region depending on the direction of the domain switch. Hence, the entry and exit gates expand and reduce the valid virtual address range by modifying TCR_ELx.TxSZ.

Because the outer domain cannot modify the value of TCR, to expose the inner domain, attackers residing in the outer domain may attempt to manipulate TCR by jumping to the TCR control instructions (Line 18 and 52 in FIG. 6) in the gates. This could be more fatal because TCR consists of several fields having a direct bearing on the security of the inner domain, i.e., TxSZ, Ax and TGx that control the address translation system.

However, all fields of TCR just hold constant values after they are set up at system boot-up. Therefore, even if attackers succeed to manipulate TCR, it is possible to prevent them from accessing the inner domain by not allowing the outer domain to run with a modified TCR. To do this, the domain switching unit 120 may insert simple code snippets confirming the correctness of the value of TCR behind TCR control instructions, as seen in Line 21-27 and 54-60 of the IDC code in FIG. 6.

2) Interrupt Disabling

The IDC disables interrupts at the entry gate to ensure the atomicity of the gates. It may simply harden our TxSZ-based privilege separation mechanisms by preventing control from being intercepted by the outer domain when the control is in the gates or in the inner domain.

However, this can be bypassed if attackers bend the control flow to skip the interrupt-disabling instructions (Line 11-13 in FIG. 6) in the entry gate. Attackers then can maliciously generate interrupts to get control (1) immediately after modifying TCR in the entry gate or (2) while the execution of the inner domain.

Figure 7:
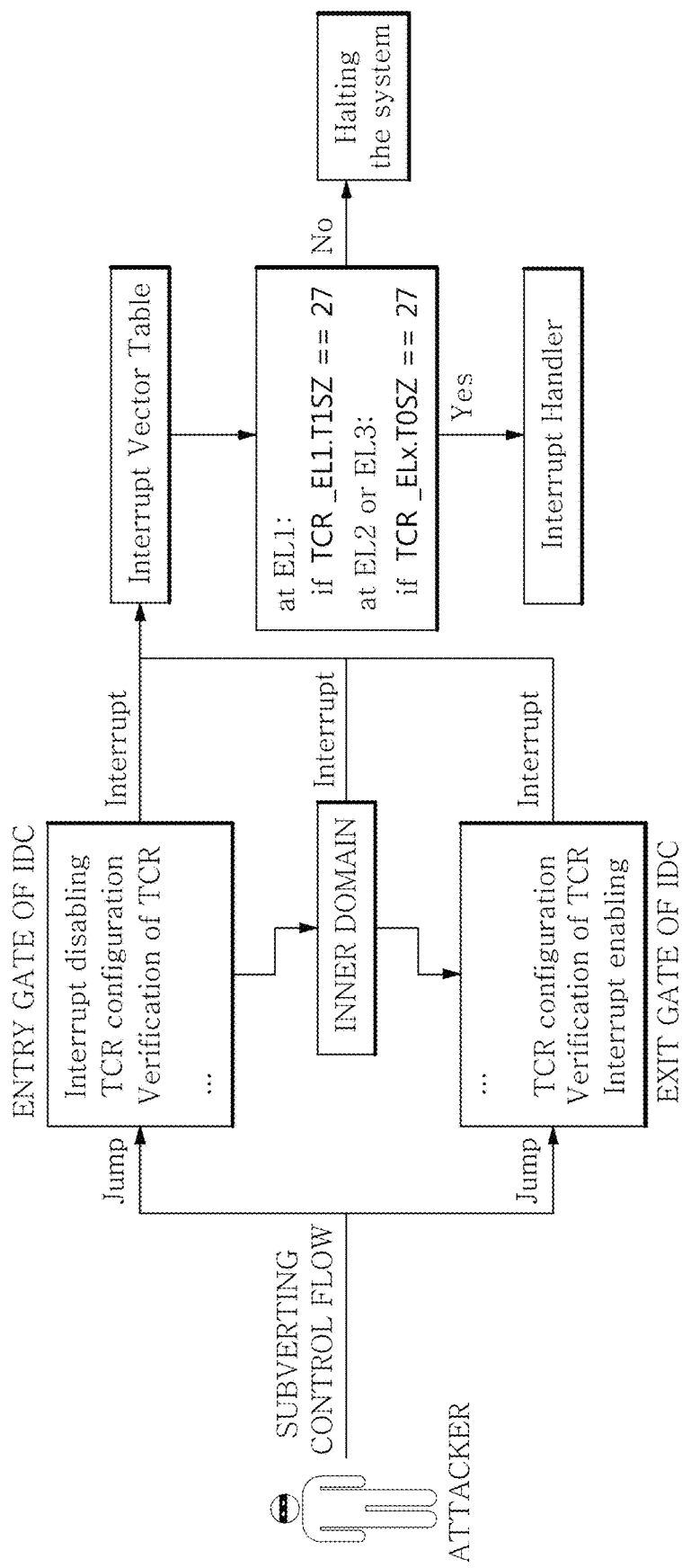
FIG. 7 shows a defense mechanism for protecting the atomicity of a switching mechanism against control flow hijacking attacks, initiated from an outer domain according to an embodiment of the present disclosure.

FIG. 7 shows a defense mechanism for protecting the atomicity of the switching mechanism against control flow hijacking attacks, initiated from the outer domain according to an embodiment of the present disclosure. Referring to FIG. 7, code snippet similar to Line 54-60 of the IDC code is added before the interrupt handler. The code snippet checks the value of TCR, and if TCR does not have the value corresponding to the outer domain (that is, interrupts are occurred in the inner domain or in the middle of the IDC), then it halts the system.

3) ASID (Address Space Identifier)

After control returns back from the inner domain to the outer domain, attackers in the outer domain may be able to eavesdrop on the inner domain region through cached TLB entries storing address mappings of the inner domain. To resolve this problem, the IDC needs to invalidate all TLB entries associated with the inner domain in the exit gate before returning to the outer domain. But, this solution is likely to degrade performance as it increases the TLB miss rate.

However, AArch64 features ASID at EL1. Therefore, TLB invalidations can be eliminated when system software runs at EL1. To achieve this, the address space of the inner domain is configured as non-global and a unique ASID is assigned to the inner domain. Then the outer domain having a different ASID is restricted from accessing the inner domain through cached TLB entries due to the mis-match of the ASID.

To implement this, the domain switching unit 120 according to an embodiment of the present disclosure must change the current ASID while switching domains. For example, at EL1, ASID is defined by TTBRx_EL1, so the domain switching unit 120 changes the current ASID by updating the value of TTBRx_EL1.

Furthermore, the domain switching unit 120 may change the current ASID using TCR_EL1.A1. According to the default setting of AArch64 Linux, TCR_EL1.A1 is 0. That is, TTBR0_EL1 determines the current ASID. The domain switching unit 120 leaves the outer domain to follow the setting of Linux, but in the inner domain, TTBR1_EL1 determines the current ASID by toggling TCR_EL1.A1 during the domain switching. Thus, the domain switching unit 120 can assign a unique ASID to the inner domain by (1) writing a unique ASID to TTBR1_EL1 and (2) avoiding the assignment of the same ASID to TTBR0_EL1.

4) Inner Domain Stack

The stack is frequently used as a means of attacks, such as code reuse attacks. Moreover, many types of critical data are temporally stored in the stack. Thus, the inner domain should use its own stack, separate from the outer domain. Therefore, the entry gate of the IDC switches the value of the stack pointer to a pre-allocated stack in the inner domain (see Line 29-38 in FIG. 6), and the exit gate restores the stack pointer to that of the original one (see Line 46-47 in FIG. 6). As the system 100 of the present disclosure supports multi-core environments, the inner domain of each core has its own stack.

5) Port to Each System Level

When the system 100 of the present disclosure is incorporated into a normal OS or a secure OS running at EL1, the IDC can be used as shown in FIGS. 6A and 6B. However, if the system 100 of the present disclosure is applied to other levels of system software running at EL2 or EL3 (i.e., a hypervisor or a secure monitor), the IDC needs to be modified slightly. This is because the ASID feature is not supported at EL2 and EL3.

Thus, the IDC must perform the TLB invalidation to prevent the inner domain from being revealed to the outer domain. More specifically, in the code of IDC, TCR control instructions (see Line 18 and 52 in FIG. 6) do not have to change the value of TCR.A1 and a TLB invalidation instruction (TLBI*) must be inserted in Line 61 of the exit gate. Furthermore, the IDC needs to set TxSZ to 26 instead of 25 when entering the inner domain. However, this is not mandatory if the inner domain requires a much larger address space.

The intra-level privilege separation technique according to an embodiment of the present disclosure can make the inner domain provide sufficient monitoring capabilities to security applications residing in the inner domain region. For example, the inner domain initially provides unrestricted memory access for security applications, and can enable security applications to monitor system behaviors by mimicking the trap-and-emulation technique, widely used in virtualization environments.

Figure 8:
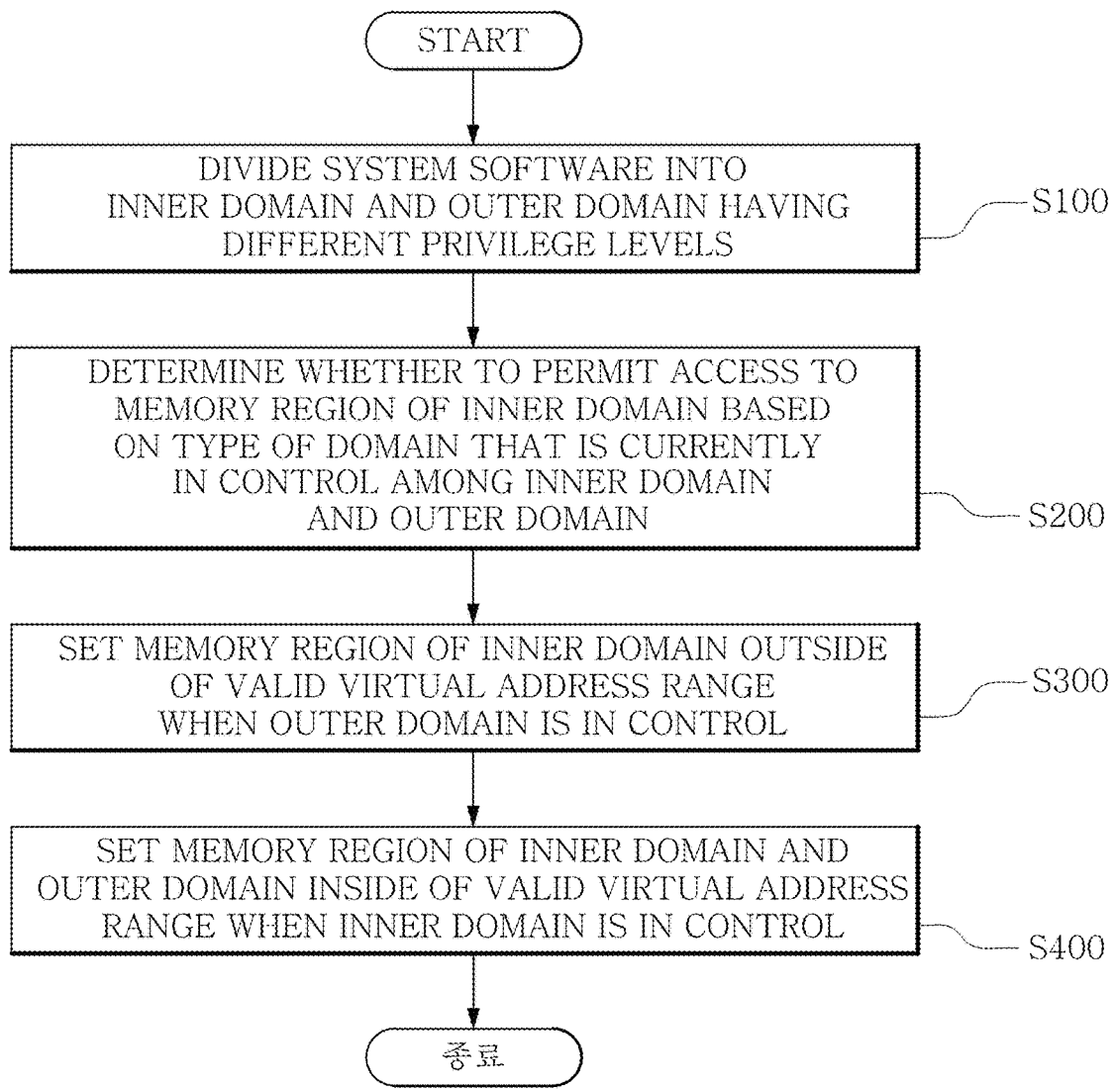
FIG. 8 is a flowchart of an intra-level privilege separation method for managing system software on an ARM processor according to an embodiment of the present disclosure.

FIG. 8 is a flowchart of an intra-level privilege separation method for managing system software on an ARM processor according to an embodiment of the present disclosure. The present disclosure may be realized by the system 100 for intra-level privilege separation described above. Referring to FIG. 8, the intra-level privilege separation method for managing system software on an ARM processor may include dividing system software into inner and outer domains having different privilege levels (S100), determining whether to permit the access to the memory region of the inner domain based on the type of domain that is currently in control among the inner domain and the outer domain (S200), when the outer domain is in control, setting the memory region of the inner domain outside of the valid virtual address range (S300), and when the inner domain is in control, setting the memory regions of the inner domain and the outer domain inside of the valid virtual address range (S400).

The computer-readable recording medium according to an embodiment of the present disclosure may include instructions for performing the method. Furthermore, the method may include the operations of the system 100 at least in part or in whole.

FIGS. 9 to 13 show experimental results according to an embodiment of the present disclosure.

FIG. 9 shows the response rate expressed as cpu cycle when the outer domain invokes an inner domain call (IDC). In FIG. 9, Big Core and Little Core are experiments conducted for each case of big.LITTLE structure in which higher performance core and lower performance core are used together in ARM SoC. Furthermore, ASID and TI (TLB Invalidation) each represent security technique used at the time of transition from the inner domain to the outer domain.

Specifically, there is a need for an approach to prevent the outer domain from accessing the inner domain by making ill use of address switching information of the inner domain cached in TLB. In this instance, there are the results of experiments on each case using a method for separating TLB through ASID and a method for invalidating all TLB information through TI at the time of transition from the inner domain to the outer domain.

FIGS. 10 and 11 show LMBench for the kernel and synthetic benchmark for application when security application does not operate. Furthermore, FIGS. 12 and 13 show LMBench for kernel and synthetic benchmark for application when security application operates. That is, FIGS. 12 and 13 show the results of installing a security application in the inner domain. The security application traps system calls of the outer domain and monitors whether applications operating in the outer domain comply with given access policies.

While the present disclosure have been hereinabove described with reference to the embodiments shown in the drawings, this is for illustrative purposes only and it will be understood by those skilled in the art that various modifications in form and details may be made thereto. However, it should be noted that such modifications fall within the technical scope of protection of the present disclosure. Therefore, the true technical scope of protection of the present disclosure should be defined by the technical spirit of the appended claims.

What is claimed is:

1. An intra-level privilege separation system for managing system software on an ARM processor, comprising:
   an intra-level domain isolation unit configured to divide the system software into an inner domain and an outer domain having different privilege levels; and
   a domain switching unit configured to determine whether to permit the access to a memory region of the inner domain based on the type of domain that is currently in control among the inner domain and the outer domain,
   wherein the domain switching unit inserts a code snippet confirming a value of a translation control register (TCR) into control instructions of the translation control register.

2. The intra-level privilege separation system according to claim 1, wherein the system software is based on first translation table base register (TTBR0),
   the intra-level domain isolation unit sets the memory region of the inner domain outside of valid virtual address range when the outer domain is in control, and sets memory regions of the inner domain and the outer domain inside of valid virtual address range when the inner domain is in control, and
   the first translation table base register starts virtual address space translation from the bottom (0).

3. The intra-level privilege separation system according to claim 2, wherein the intra-level domain isolation unit sets T0SZ within translation control register (TCR) to 27 when the outer domain is in control, and sets T0SZ within translation control register (TCR) to 26 when the inner domain is in control.

4. The intra-level privilege separation system according to claim 1, wherein the system software is based on second translation table base register (TTBR1),
   the intra-level domain isolation unit sets the memory region of the inner domain outside of valid virtual address range when the outer domain is in control, and sets memory regions of the inner domain and the outer domain inside of valid virtual address range when the inner domain is in control, and
   the second translation table base register starts virtual address space translation from the top (0xFFFF FFFF FFFF FFFF).

5. The intra-level privilege separation system according to claim 4, wherein the intra-level domain isolation unit sets T0SZ within translation control register (TCR) to 27 when the outer domain is in control, and
   sets T0SZ within translation control register (TCR) to 25 when the inner domain is in control, and data in the virtual address space associated with the inner domain is mapped to intermediate entries in page table entries of the inner domain.

6. The intra-level privilege separation system according to claim 1, wherein shadow mapping of page table is configured as readable and writable, and a fixed offset of the shadow mapping is added in a virtual address space of the inner domain.

7. The intra-level privilege separation system according to claim 1, wherein the domain switching unit adds code snippet checking a value of translation control register before interrupt handler, and
   when the translation control register does not have a corresponding to the outer domain, the domain switching unit halts the system.

8. The intra-level privilege separation system according to claim 1, wherein the domain switching unit configures an address space of the inner domain as non-global, and assigns a unique Address Space Identifier (ASID) to the inner domain.

9. The intra-level privilege separation system according to claim 1, wherein the system software includes at least one of a normal OS, a secure OS, a hypervisor, and an ARM TrustZone.

10. An intra-level privilege separation method for managing system software on an ARM processor, comprising:
    dividing the system software into an inner domain and an outer domain having different privilege levels;

determining whether to permit the access to a memory region of the inner domain based on the type of domain that is currently in control among the inner domain and the outer domain;

setting the memory region of the inner domain outside of valid virtual address range when the outer domain is in control; and setting memory regions of the inner domain and the outer domain inside of valid virtual address range when the inner domain is in control, wherein determining whether to permit the access to the memory region is performed by a domain switching unit, the domain switching unit inserts a code snippet confirming a value of a translation control register (TCR) into control instructions of the translation control register.

11. The intra-level privilege separation method according to claim 10, wherein the system software is based on first translation table base register (TTBR0), and the method further comprises:

setting T0SZ within translation control register (TCR) to 27 when the outer domain is in control; and setting T0SZ within translation control register (TCR) to 26 when the inner domain is in control.

12. The intra-level privilege separation method according to claim 10, wherein the system software is based on second translation table base register (TTBR1), and the method further comprises:

setting T0SZ within translation control register (TCR) to 27 when the outer domain is in control; and setting T0SZ within translation control register (TCR) to 25 when the inner domain is in control, wherein data in a virtual address space associated with the inner domain is mapped to intermediate entries in page table entries of the inner domain.

* * * * *